A. F. SHEPARD.
NUT LOCK.
APPLICATION FILED APR. 24, 1912.
1,058,475.
Patented Apr. 8, 1913.
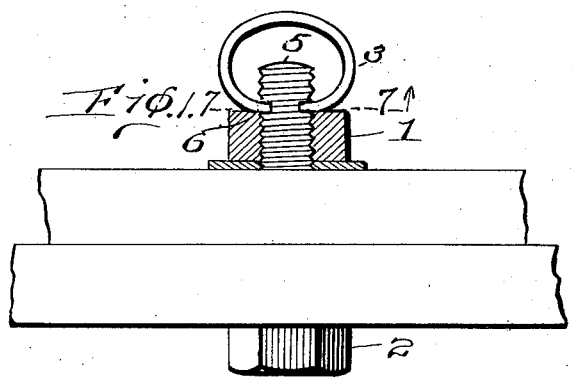
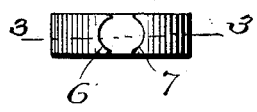
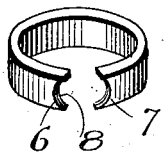
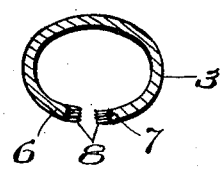
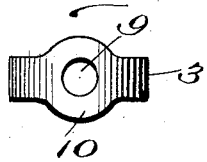
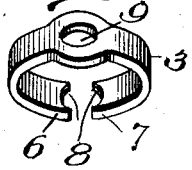
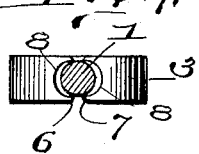
Witnesses
Inventor
Arthur F. Shepard
By Mason Fenwick & Lawrence
Attorneys

UNITED STATES PATENT OFFICE.

ARTHUR F. SHEPARD, OF SEATTLE, WASHINGTON.

NUT-LOCK.

1,058,475.  Specification of Letters Patent.  Patented Apr. 8, 1913.

Application filed April 24, 1912. Serial No. 692,982.

*To all whom it may concern:*

Be it known that I, ARTHUR F. SHEPARD, a citizen of the United States, residing at Seattle, in the county of King and State of Washington, have invented certain new and useful Improvements in Nut-Locks; and I do hereby declare the following to be a full, clear, and exact description of the invention, such as will enable others skilled in the art to which it appertains to make and use the same.

My invention relates to an improvement in nut locks and has for its object to provide a simple, cheap, and efficient nut lock, and to this end it consists of the novel construction and combination of parts hereinafter described.

The invention is illustrated in the accompanying drawings, wherein like characters indicate like parts throughout the several views.

Referring to the drawings: Figure 1 is a view partly in elevation and partly in section, showing one of my improved nut locks applied to lock the nut on a bolt. Fig. 2 is a bottom plan view of the nut lock shown in Fig. 1 removed from its working position. Fig. 3 is a section taken through the nut lock on the line 3—3 of Fig. 2. Fig. 4 is a perspective view of one form of the device. Fig. 5 is a top plan view of an alternative form. Fig. 6 is a perspective view of Fig. 5. Fig. 7 is a view partly in section along the line 7—7 of Fig. 1.

The operation of the device is as follows: A nut 1 is screwed home on a bolt 2, the divided ring 3 is formed from a flat plate bent to the form of an oval and terminating in spring prongs 6 and 7 which are formed at their opposed ends with segmental threads 8 adapted to engage the threaded end on bolt 1 in considerable friction. The nut lock as shown in Fig. 4 is in the form of an oval ring cleft in the line of its longitudinal axis and may be engaged in its annular opening by a suitable lever, and run on its threads tightly against the nut. When sufficiently extended by the lever the separated ends of the ring are slipped over the threaded end 5 of the bolt 2. Jaws 6 and 7 are provided with threaded segments 8 of less diameter than that of the threaded end 5, so that as the ring is liberated by the lever the ends of the segment threads 8 grip the end 5. The closer the engagement between the threaded edges 6 and 7 with the nut 1, the more rigid is the engagement made with the nut lock, which is thus sprung slightly out of its normal form. An outward movement of the nut also brings the threaded jaws 6 and 7 in more rigid engagement with the bolt, as such movement likewise tends to spring the lock out of its normal form.

A modification of this device is shown in Figs. 5 and 6 in which an aperture 9 is shown as oppositely disposed to the threaded prongs 6 and 7 and formed midway of the lateral axis of ring 3. The width of the ring adjacent to the aperture 9 is provided with enlargements 10 for the purpose of strengthening the oval ring. This form of my device is adapted for use on bolts having a long threaded projection outside of the holding nut, it being understood that the bolt passes through opening 9.

This device may be readily applied by means of a bar introduced within the ring until the same is sufficiently extended, and when applied it securely holds the nut against loosening on its bolt.

Having thus fully described my invention what I claim is:

1. In a lock nut, a threaded bolt, and a spring member having ends formed with segmental threads, the threads of the spring member being non-concentric with those of the bolt.

2. In a lock nut, a threaded bolt, and a spring locking member having ends formed with points for engaging the threaded bolt, one side of each of said points sloping gradually away from the thread.

3. In a nut lock, a threaded bolt, a spring member having ends which engage the threaded bolt, and segmental threads formed on the ends of the spring member the curvature of the threaded ends of the spring being greater than that of the threaded bolts.

In testimony whereof I affix my signature in presence of two witnesses.

ARTHUR F. SHEPARD.

Witnesses:
G. WARD KEMP,
C. C. PHILLIPS.

Copies of this patent may be obtained for five cents each, by addressing the "Commissioner of Patents, Washington, D. C."